Aug. 30, 1966  A. R. SCHLEICHER, JR  3,269,204
GEAR MOTORS AND GEARING UNITS THEREFOR
Filed Jan. 6, 1964  3 Sheets-Sheet 2
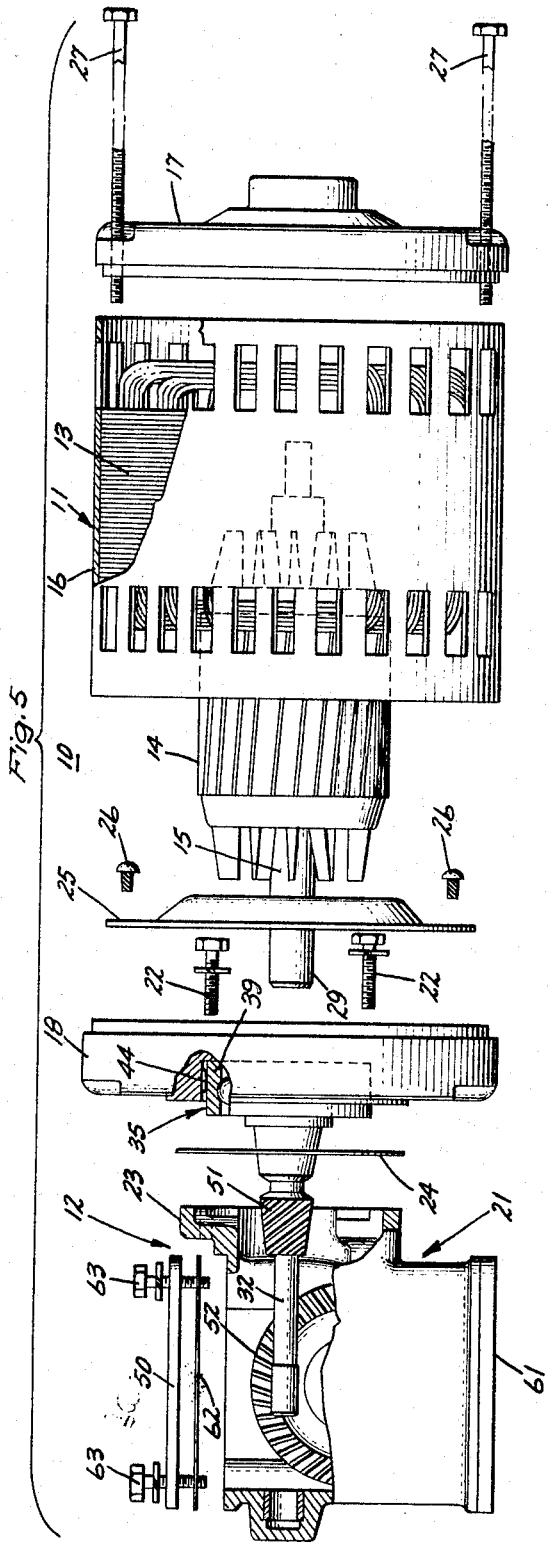
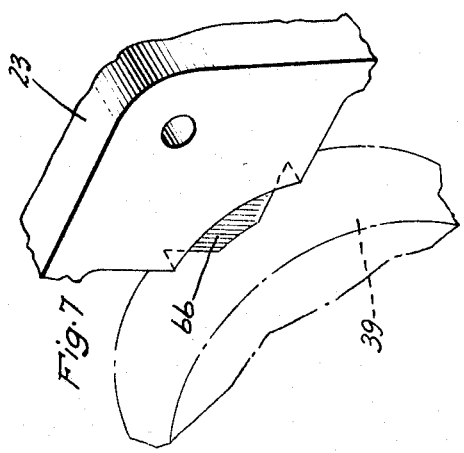
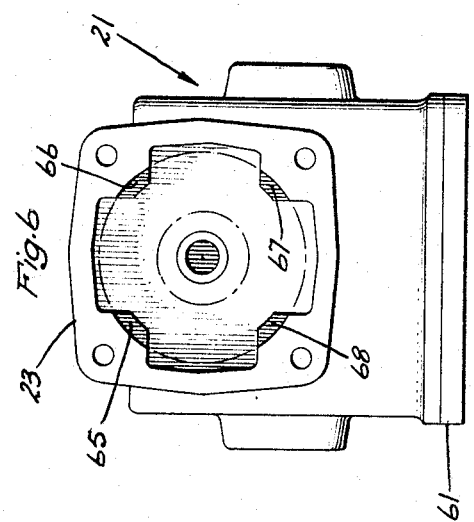
INVENTOR.
Allison R. Schleicher, Jr.
BY Henry J. Marimich
Attorney.

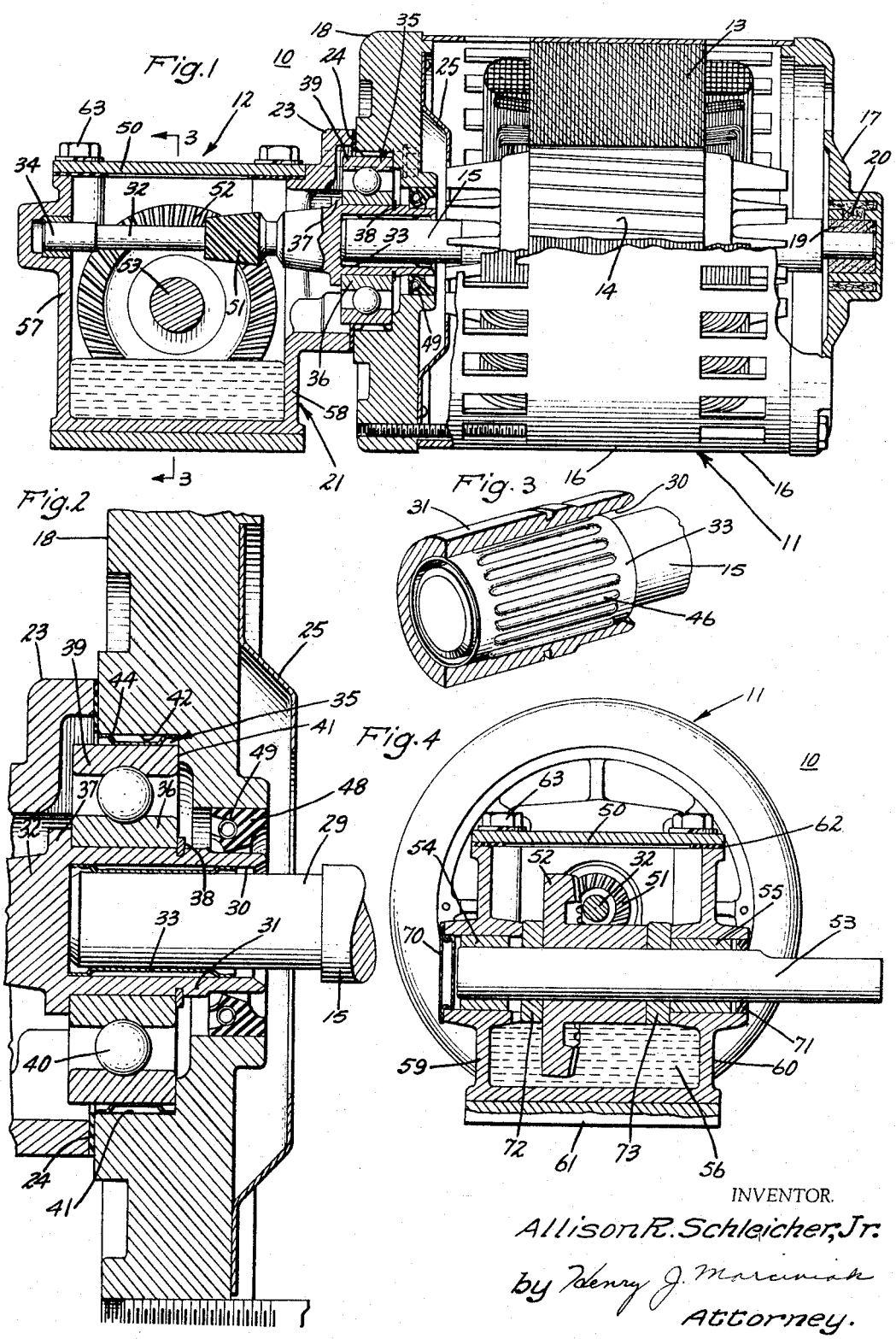

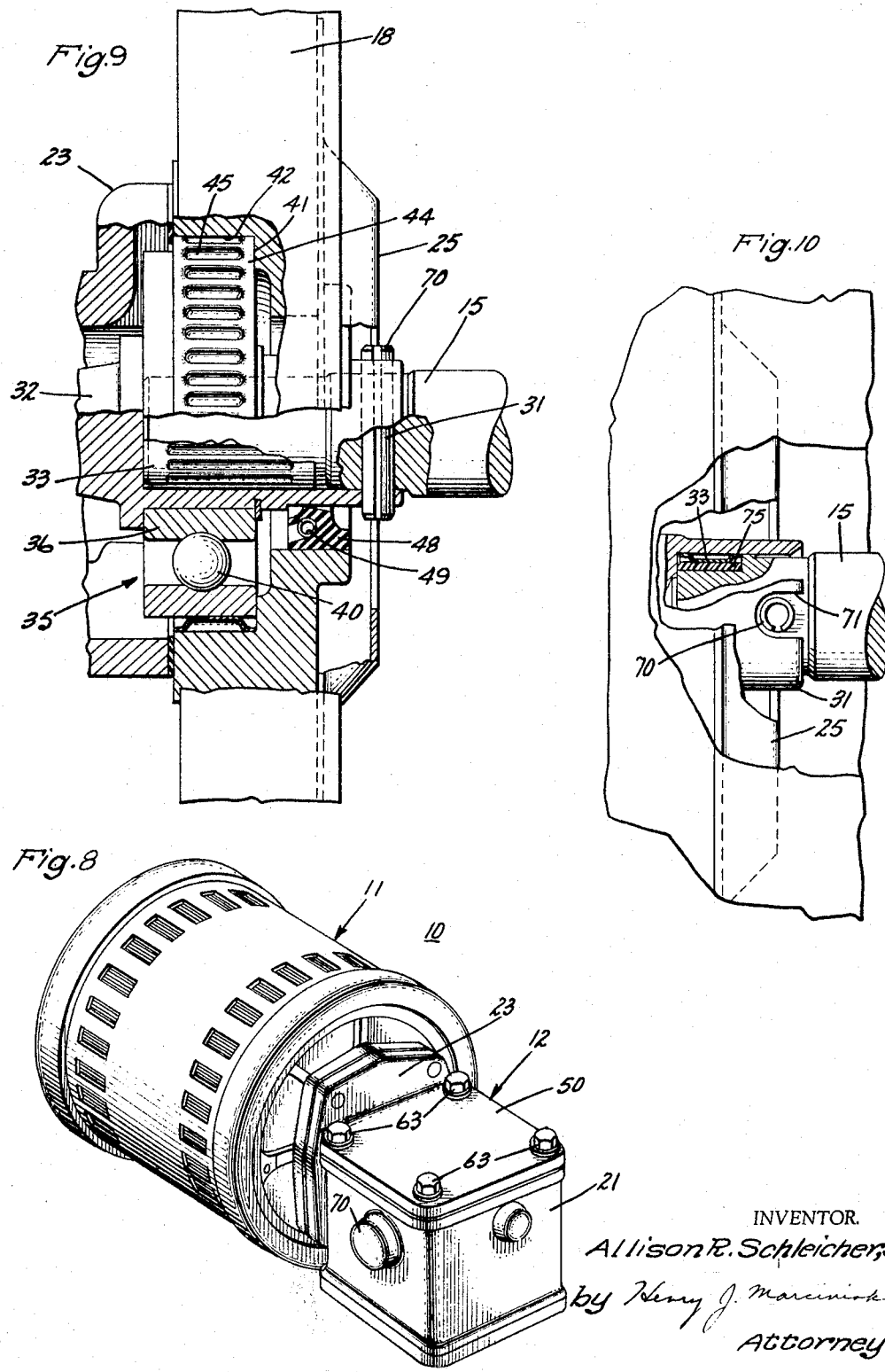

United States Patent Office 3,269,204
Patented August 30, 1966

3,269,204
GEAR MOTORS AND GEARING UNITS THEREFOR
Allison R. Schleicher, Jr., Upper Montclair, N.J., assignor to General Electric Company, a corporation of New York
Filed Jan. 6, 1964, Ser. No. 335,818
8 Claims. (Cl. 74—424.5)

This invention relates generally to gear motors and more specifically to an improved coupling and bearing arrangement between the motor and the gearing unit of a gear motor.

In a commonly used arrangement the motor shaft is rigidly coupled with the input shaft of the gearing unit by means of a key. The gearing unit, for example, may be a speed reducer having a pinion shaft carrying a pinion meshed with a worm gear carried on the output shaft. For such a gear motor to perform satisfactorily in service, it is, of course, necessary that the shafts of both the gearing unit and the motor be positioned in proper alignment. Unless the shafts are maintained in proper alignment, the gear bearings or other parts of the gear motor may bind, and premature failure of the gear motor may result. It is desirable in such a gear motor that some provision be made for correcting minor misalignments between the input shaft of the gearing unit and the motor shaft.

In gear motor constructions where the gearing unit is attached to the motor end shield, it is particularly desirable that the shaft alignment be achieved without need for machined surfaces on the end shield that must be held within close tolerances. Preferably, the motor end shield is made from aluminum, and if accurately machined surfaces are required in order to properly align the shafts under all conditions of operation, an aluminum end shield would require the use of a steel sleeve insert. Such an arrangement would, of course, increase the number of parts and manufacturing costs.

Accordingly, it is a general object of my invention to provide a new and improved bearing support and coupling arrangement for a gear motor.

Another object of my invention is to provide a new and improved gear motor wherein the motor end shield does not require machined surfaces held with close tolerances in order to achieve proper alignment with the gearing unit.

It is a more specific object of the present invention to provide an improved gear motor wherein minor misalignments between the motor shaft and the input shaft of the gearing unit can be readily compensated for.

A further object of the present invention is to provide gearing units that are readily adaptable for use in conjunction with several different types of motors.

In accordance with one form of my invention the pinion shaft and the driving end of the motor shaft of a gear motor are held in torsional engagement by a resilient tolerance ring. The pinion and motor shafts are rotatably supported by three bearings, a pair of outer bearings which support the outer ends of the coupled shafts, and an intermediate bearing. Preferably, the intermediate bearing is a ball bearing and includes an inner race carried on the coupling portion of the pinion shaft. The tolerance ring is engaged between the driving end of the shaft and a bore in the coupling portion of the pinion shaft. With the driving end of the motor shaft extending into the coupling portion and into the inner race of the intermediate bearing, both shafts are supported for rotation at one end by the intermediate bearing, and coupling between the shafts is effected essentially within the intermediate bearing. Such an arrangement provides the advantage that a certain amount of flexing is permissible between the two shafts to correct minor misalignments.

The outer race of the intermediate bearing extends into a bearing receiving recess formed in the end shield of the motor to which the gear case is attached and is essentially supported by the end shield. The intermediate bearing is aligned with respect to pinion shaft outer bearing by means of a positioning means, such as an interrupted rabbet formed in the gear case, which engages a portion of the outer race. Preferably, a second tolerance ring is disposed between the outer race and the end shield member within the recess to hold the outer race in nonrotational relation with respect to the end shield member. This arrangement for supporting the outer race of the bearing permits the motor to be coupled with the gearing unit without need for the dimensions of the bearing receiving recess to be designed within close tolerances.

According to another aspect of the invention, the gearing unit is provided with a unitary gear case formed with a first pair and a second pair of oppositely disposed walls. The output shaft of the gearing unit carries an output gear meshed with the pinion and is rotatably supported by the first pair of walls. The pinion shaft extends transversely of the output shaft and is supported at one end for rotation by the pinion shaft outer bearing which is mounted in one of the walls of the second pair of walls. At the other end the pinion shaft is supported for rotation by the intermediate bearing. The unitary case construction permits the output gear and pinion gears to be accurately aligned by machined surfaces and provides an oil-tight sump tank for the gear case. Further, the improved case construction presents a greater degree of flexibility in mounting the gearing unit.

The subject matter which I regard as my invention is particularly pointed out and distinctly claimed in the concluding portion of this specification. My invention however, together with further objects and advantages thereof may be best understood by reference to the following description taken in conjunction with the accompanying drawings in which:

FIGURE 1 is a side view partially in section of an improved gear motor embodying one form of my invention;

FIGURE 2 is an enlarged view of the bearing support and coupling arrangement shown in FIGURE 1;

FIGURE 3 is a fragmentary view in perspective of the coupling portion of the pinion shaft, the coupling portion being cutaway to show the tolerance ring in torsional engagement with the driving end of the motor shaft;

FIGURE 4 is a sectional view of the gearing unit taken generally along line 3—3 of FIGURE 1 and showing the entire cross-section of the gearing unit;

FIGURE 5 is a partially sectionalized exploded view of the gear motor incorporating the improved bearing support and coupling arrangement of the invention;

FIGURE 6 is an end view of the gear case showing the interrupted rabbet used to position the outer race of the ball bearing in the gear case;

FIGURE 7 is a fragmentary perspective view of one interrupted rabbet;

FIGURE 8 is a perspective view of the gear motor with the motor and gearing unit in assembled relation;

FIGURE 9 is a side view, partially sectionalized, of the bearing and coupling arrangement shown in FIGURE 2 incorporating an additional modification; and FIGURE 10 is a fragmentary top view of the bearing and coupling arrangement illustrated in FIGURE 9 with the end shield cut away to show the torque pin coupling arrangement.

Referring now more particularly to FIGURES 1 to 8 of the drawings, I have illustrated a gear motor 10 which includes an induction motor 11 arranged to drive a gearing unit generally identified by the reference numeral 12. The induction motor 11 includes a stator 13, a rotor 14 carried on a motor shaft 15, a housing sleeve 16, an end shield member 17, and an adapter end shield member 18. The motor shaft 15 is supported at the right end, as shown in FIGURE 1, by a sleeve bearing 19 mounted within the end shield member 17 and lubricated by oil stored in the absorbent material 20. A ball bearing arrangement might also be used at this point.

As is shown in the exploded view of the gear motor 10 illustrated in FIGURE 5, the adapter end shield member 18 is attached to the gear case 21 by four bolts 22, only two of which are shown in FIGURE 5. To effect a seal between the flanged portion 23 and the mating surface on the end shield member 18, a gasket 24 is employed. A baffle 25 is attached by fasteners 26 to the inner side of the end shield 18 to control the air flow at the left side of the motor 11. Essentially, the motor 11 is held in assembled relation by four through-bolts 27, which extend through the end shield member 17, the stator 13 and the end shield member 18. When the through-bolts 27 are tightened, the end shield members 17 and 18 are drawn against the sleeve 16 to hold the rotor 14 and the stator 13 in assembled relation.

It will be seen in FIGURE 2 that the driving end 29 of the motor shaft 15 extends into a bore 30 formed in the coupling portion 31 of the pinion shaft 32 and is held in torsional engagement with the shaft by means of a corrugated tolerance ring 33. A three bearing type of support is provided for the coupled shafts 32 and 15. The left end of the pinion shaft 32, as best seen in FIGURE 1, is supported by the outer pinion shaft bearing 34 mounted in the gear case 21. The right end of the motor shaft 15 is rotatably supported by the outer bearing 19. It will be noted, however, that the coupled ends of the shafts 32 and 15 are supported by an intermediate bearing, which preferably is a ball bearing 35.

Returning to FIGURE 2, the ball bearing 35 includes an inner bearing race 36 secured to the coupling portion 31 by a press fit and held in an axial position by a shoulder 37 and a split ring 38. Also, the ball bearing 35 includes an outer bearing race 39 with a plurality of balls 40 positioned between the inner and outer bearing races 36 and 39. It will be seen in FIGURE 2 that the adapter end shield member 18 is formed with a bearing-receiving recess 41 having an annular surface 42 spaced from the outer bearing race 39. Interposed between the annular surface 42 and the outer bearing race 39 is a resilient tolerance ring 44 formed of spring steel.

As is best seen in FIGURE 9, the tolerance ring 44 is formed with a plurality of corrugations 45 which extend radially inward towards the outer periphery of the outer race 39. When the ball bearing 35 is forced into the bearing-receiving recess 41 with the tolerance ring 44 in position, an interference fit with the end shield member 18 is provided. The tolerance ring 44 prevents rotational movement of the outer race 39 and permits the bearing 35 to be assembled in the recess 41 without need for close tolerances in the diameter of the recess 41 because of the resiliency of the tolerance ring 44. This arrangement results in the important advantage that it is possible to fabricate the adapter end shield member of a material, such as aluminum, without need for a close tolerance steel sleeve to center the bearing 35 and additionally will compensate for the different rates of expansion of the steel bearing outer race and aluminum adapter end shield as temperature increases during operation.

It will be noted that the connection between the pinion shaft 32 and the motor shaft 15 is also made by means of the corrugated tolerance ring 33, which is similar to the tolerance ring 44. The tolerance ring 33, however, is formed with a plurality of corrugations 46, as shown in FIGURE 3, which extend radially inward to engage the motor shaft 15. To obtain an interference fit with the driving end 29, the motor shaft 15 is forced into the bore 30 of the pinion shaft 32 with the tolerance ring 33 in place within the bore 30. Because of the resiliency of the tolerance ring, the bore 30 in the pinion shaft does not have to be held to close dimensional tolerances. In the illustrated exemplification of the invention a diameter bore between .4886 and .4871 of an inch was found to be satisfactory. The tolerance ring 33 also aided in centering the motor shaft 15 within the pinion shaft 32 and permitted some flexing between the shafts 15 and 32 to compensate for minor misalignment. An oil seal 48 with or without a garter or leaf spring 49 provides a seal between the gearing unit 12 and motor 11.

Continuing with the description of the gear motor 10, I will now more particularly describe the gearing unit 12 by reference to FIGURE 1. The gearing unit 12 includes the gear case 21, a coverplate 50, a pinion 51 on the pinion shaft 32, an output gear 52 meshed with a pinion 51 and carried on an output shaft 53 supported for rotation on a pair of sleeve bearings 54, 55 (see FIGURE 4). It will be noted that the gear case 21 is formed of unitary construction and is preferably formed of a single casting. The lower portion of the gear case 21 serves as a well for lubricating oil 56.

The gear case 21 includes a first pair of oppositely disposed walls 57, 58 (see FIGURE 1) in which provision is made for the alignment of the pinion shaft 32, as will hereinafter be more fully explained. Further, the gear case 21 includes a second pair of opposited disposed walls 59 and 60 (see FIGURE 4) in which the bearings 54 and 55 are mounted. The gear case 21 may or may not be attached to a mounting plate 61. The coverplate 50 serves as an inspection plate and may be removed by disconnecting four bolts 63 which secure the coverplate 50 in assembled relation with the gear case 21. A seal is maintained between the coverplate 50 and gear case 21 by a gasket 62.

Turning to FIGURES 6 and 7, it will be seen that the flanged portion 23 of the gear case 21 has an interrupted rabbet formed by four machined surfaces 65, 66, 67 and 68. When the outer ball bearing race 39 is engaged by the surfaces 65, 66, 67 and 68, the pinion shaft 32 is accurately aligned with respect to the output shaft 53, and the pinion 51 is properly meshed with the output gear 52, as seen in FIGURE 1. Thus, with pinion shaft 32 positioned by the interrupted rabbet in the gear case 21 and and by the bearing 34 mounted in the wall 57 of the gear case 21 and further with the output shaft 53 supported in the sleeve bearings 54, 55, the shafts 32 and 53 are properly aligned with respect to each other. An important advantage in the unitary gear case construction is that it is possible to achieve alignment with machined accuracy and without need for shimming to achieve proper alignment and relative location of pinion and gear.

In the illustrated exemplification of the invention the pinion 51 was an integral part of the pinion shaft 32 and the output gear 52 was press fitted on the output shaft 53. As is best seen in FIGURE 4, an end cap 70 was mounted to seal the opening in the gear case 21 for bearing 54 disposed at one end of the output shaft 53. At the other end of the shaft 53, an oil seal 71 was provided. Depending upon the application of the gear motor 10, a pair of thrust washers 72 and 73 may be used, or if required, needle thrust bearings may be employed at this location. Likewise needle radial bearings may be substituted for sleeve bearings 54 and 55.

Having more specific reference now to FIGURES 1, 4 and 5, I will now more fully describe the manner in which the gear motor 10 was assembled. The output shaft 53 is press fitted into the bore of the output gear 52 which the output gear 52 and thrust washers 72, 73 in the gear case 21, the output shaft 53 being inserted through one of the bearing openings. After the output gear 52 is mounted and properly positioned on the output shaft 53, the end cap 70 and oil seal 71 are attached. If double shaft extensions are required two seals are employed. The ball bearing 35 is locked in position against the shoulder 37 of the pinion shaft 32 by slipping the split ring 38 into the groove formed on the pinion shaft 32. The outer race 39 of the ball bearing 35 is forced into the bearing receiving recess 41 of the end shield member 18 with the tolerance ring 44 positioned in the recess 41.

This preliminary assembly consisting of the end shield member 18, the ball bearing 35 and the pinion shaft 32 is inserted into the gear case 21 with the gasket 24 in position on the flanged portion 23. The left end of the pinion shaft 32 is placed in the sleeve bearing 34 so that the outer bearing race 39 is engaged with the interrupted rabbet formed on the flanged portion 23. The assembly of the gearing unit 12 is completed by bolting the end shield member 18 and the coverplate 50 to the gear case 21 and inserting the oil seal 48 in position between the coupling portion of the pinion shaft 31 and end shield member 18.

In order to assemble the motor 11 with the gearing unit 12, the baffle 25 is attached to the end shield member 18, and the driving end of the motor shaft 15 is forced into the tolerance ring 33 positioned within the bore 30 of the pinion shaft 32. The stator assembly comprising the end shield member 17, the stator member 13 and the sleeve 16 is then placed in assembled relation with the end shield member 18 by securing the through-bolts 27.

In FIGURES 9 and 10 I have illustrated a modification of the improved coupling arrangement wherein a split pin 70 in the motor shaft 15 is disposed in a slot 71 in the coupling portion 31 of the pinion shaft 32. With this arrangement slippage of the motor shaft 15 within the tolerance ring 33 under extreme torque or shock conditions is prevented. Further, I have also provided a plastic sleeve 75 between the tolerance ring 33 and the motor shaft 15. It was found that under conditions of severe misalignment between the motor shaft 15 and the pinion shaft 32, a permanent deformation of the corrugations of the tolerance ring 33 could occur. Such a permanent deformation could result in a premature failure of the tolerance ring 33. Thus, the plastic sleeve 75, preferably of nylon, was used to prevent excessive deformation of the corrugations.

Since all of the parts shown in FIGURES 9 and 10, with the exception of the modification to the pinion shaft 32 and motor shaft 15 required to accommodate the pin 70 and the plastic sleeve 75 are essentially the same, I have used the same reference numerals to identify the corresponding parts thereof. The motor shaft 15 is centered within the pinion shaft 32 and coupled therewith by means of a resilient tolerance ring 32. Both shafts 15 and 32 are supported by the ball bearing 35 located in an intermediate position between bearings 19 and 34 (see FIGURE 1) and are coupled essentially within the ball bearing 35. The outer race 39 of the ball bearing 35 is held within the bearing receiving recess 41 formed in the end shield member 18 by a second tolerance ring 44. Since this arrangement has been previously described, a detailed description will not be repeated herein in connection with the modification illustrated in FIGURES 9 and 10. It will be understood, of course, that the coupling and bearing arrangement as shown in FIGURES 9 and 10 functions in the same manner as the one illustrated in FIGURE 2.

From the foregoing description, it will be apparent that a new and improved gear motor is provided wherein the pinion shaft of a gearing unit and the motor shaft can be readily coupled and exactly aligned. An important advantage of the improved arrangement is that the gearing unit is readily adaptable to different motor sizes and types since the length of the driving end of the motor shaft and its diameter can be standardized without close tolerances. Further, the improved arrangement permits manufacturing economies to be achieved since the gearing unit can be aligned with respect to the motor end shields without need for surfaces on the end shield that must be machined to extremely close tolerances. The improved torque coupling arrangement also corrects for minor misalignments between the motor and the pinion shaft. Further, with the unitary gearing case construction having bearings of the gearing unit aligned by machined surfaces, it was found that the pinion and the output gear can be precisely aligned without need for shims, gaskets, covers and bolts thereby minimizing the possibility of oil leaks.

Although I have described my invention in connection with a specific embodiment, it will be appreciated that many modifications may be made thereto without departing from the invention. It is therefore intended by the appended claims to cover all such modifications that fall within the true spirit and scope of the invention.

What I claim as new and desire to secure by Letters Patent of the United States is:

1. In a gear motor including a gear unit having a gear case formed with a flanged portion, an output shaft rotatably supported by bearings mounted in the gear case, an output gear carried on said output shaft, a pinion shaft having a pinion meshed with said output gear, said pinion shaft supported at one end by a pinion shaft bearing mounted in the gear case and having a coupling portion at the other end, an electric motor with a motor shaft rotatably supported at one end and having a driving end for connection with the coupling portion of the pinion shaft, the improvement comprising: a ball bearing having an inner and an outer race with balls disposed therebetween, said inner race carried on the coupling portion for rotation with said pinion shaft, said coupling portion having a bore with the other end of the motor shaft disposed in said bore, a first resilient tolerance ring disposed within said bore to couple said pinion shaft with said motor shaft, a rabbet formed in the flanged portion of said gear case and engaging the outer race to align said ball bearing with respect to said pinion shaft bearing mounted in the gear case, an end shield member attached to said flanged portion and having a bearing-receiving recess with an annular surface in predetermined spaced relationship to the outer race, and a second resilient interference ring interposed between said annular surface and the outer race to hold said outer race in nonrotational relation with said end shield member.

2. In a gear motor having a gearing unit including a gear case, an output shaft rotatably supported by said gear case and having at least one end extending through said gear case, an output gear mounted on said output shaft, a pinion shaft having a pinion meshed with said output gear, said pinion shaft having at one end a coupling portion and supported at the other end by a pinion shaft bearing mounted in the gear case, and a motor including a motor shaft rotatably supported at one end and having a driving end for connection with the coupling portion of the pinion shaft, the improvement comprising: a bearing with an inner and an outer bearing race, means for mounting the inner race of said bearing on the outer periphery of the coupling portion of the pinion shaft, said coupling portion having a bore with the driving end of the motor shaft disposed in said bore, a first tolerance ring disposed between said driving end of the motor shaft and said bore to hold said pinion shaft in torsional engagement with the motor shaft, an end shield member attached to said gear case and having a bearing receiving recess, said outer race of said bearing extending into said recess, a second tolerance ring disposed between said recess and said outer race to hold said outer race in nonrotational relation with said end shield member, and means on said gear case for engaging the outer race of said bearing to align said bearing with respect to the pinion shaft bearing supported in said gear case.

3. A gearing unit for use in conjunction with an electric motor comprising a unitary gear case having a first pair and a second pair of oppositely disposed walls, a coverplate attached at the top of said gear case, an output shaft rotatably supported by the first pair of walls and extending through at least one of the walls of said first pair of walls, an output gear mounted on said output shaft, a pinion shaft extending transversely of said output shaft and having a pinion meshed with said output gear, said pinion shaft having a bore formed at the other end thereof for coupling the motor shaft with the pinion shaft, a pinion shaft bearing means mounted in one of the walls of said second pair of walls and rotatably supporting said pinion shaft at one end, a bearing having an inner and an outer race, a rabbet formed in the other one of the second pair of walls and engaging a portion of the said outer race to align said bearing with respect to said pinion shaft bearing means, means for mounting said inner race of said bearing concentrically about said bore, an adapter end shield member having a bearing receiving recess formed therein, said recess presenting an annular surface in predetermined spaced relationship with a portion of the outer race of said bearing, and a resilient interference ring disposed between said annular surface and said outer race to hold the outer race of the bearing in nonrotational relation with said adapter end shield member.

4. In a gear motor including an electric motor having a motor shaft and a shaft supporting means including an end shield with a bearing for rotatably supporting the motor shaft at one end, the improvement comprising: a unitary gear case, a pinion shaft supported for rotation at one end by a bearing mounted on said gear case and having a coupling portion for connection to the motor shaft, a pinion gear carried on said pinion shaft, an output shaft extending transversely to said pinion shaft and carrying an output gear meshing with said pinion, bearing support means mounted in oppositely disposed walls of said gear case for rotatably supporting the output shaft, an end shield attached to said gear case and having a bearing-receiving recess formed in said end shield member, an intermediate bearing having an inner race and an outer race, said outer race positioned in said bearing-receiving recess, a tolerance ring disposed between said outer race and said bearing-receiving recess to provide an interference fit therebetween, a rabbet formed on said gear case and engaging said outer face to align said intermediate bearing with respect to the bearing at said one end of the pinion shaft, said coupling portion of the pinion shaft having a bore for coupling the motor shaft therewith, and means for mounting said inner race of the intermediate bearing on said coupling portion for rotation with the pinion shaft.

5. In a gear motor including a gearing unit having a gear case formed with a flanged portion, an output shaft rotatably supported by bearings mounted in the gear case, an output gear carried on said output shaft, a pinion shaft having a pinion meshed with said output gear, said pinion shaft supported at one end by an outer pinion shaft bearing mounted in the gear case and having a coupling portion at the other end, an electric motor with a motor shaft rotatably supported at one end by an outer motor bearing and having a driving end for connection with the coupling portion of the pinion shaft, said electric motor including an adapter end shield, the improvement comprising: an intermediate bearing means having an outer bearing race nonrotatably supported by said adapter end shield and having an inner bearing race mounted on the pinion shaft for rotation therewith, said bearing means being concentrically disposed about the coupling portion of the pinion shaft, said coupling portion having a bore with the driving end of the motor shaft disposed in said bore, a resilient tolerance ring disposed between the driving end of the motor shaft and said bore to hold said pinion shaft in torsional engagement with the motor shaft within said bearing means, and means on the flanged portion of said gear case for aligning said intermediate bearing with the outer pinion shaft bearing.

6. In a gear motor including a gearing unit having a gear case, an output shaft rotatably supported by bearings mounted in said gear case and having at least one end extending through said gear case, an output gear mounted on said output shaft, a pinion shaft having at one end a coupling portion and supported at the other end by an outer pinion shaft bearing mounted in said gear case, and a motor including a motor shaft rotatably supported at one end and having a driving end for connection with the coupling portion of the pinion shaft, the improvement comprising: an intermediate bearing for supporting the coupling portion of the pinion shaft and the driving end of the motor shaft, said intermediate bearing having an inner and an outer bearing race, means for mounting the inner race of said bearing in nonrotational relation with the coupling portion of the pinion shaft, said coupling portion having a bore with the driving end of the motor shaft disposed in said bore, a first corrugated tolerance ring disposed between the driving end of the motor shaft and said bore to hold said pinion shaft in torsional engagement with the motor shaft, an end shield member attached to said gear case and having a bearing receiving recess, said outer race of said intermediate bearing extending into said recess, a second corrugated tolerance ring disposed between said outer race and said end shield member within said recess to hold said outer race in nonrotational relation with said end shield member, and an interrupted rabbet formed on said gear case and engaging said outer race of said intermediate bearing to align said bearing with respect to the outer pinion shaft bearing.

7. A gear motor comprising: a motor having a motor shaft with a driving end, a unitary gear case having a first and a second pair of oppositely disposed walls, a coverplate attached to the top of said gear case, an output shaft rotatably supported by a first pair of walls and extending through at least one of said first pair of walls, an output gear mounted on said output shaft, a pinion shaft extending transversely of said output shaft and having a pinion meshed with said output gear, an outer support bearing mounted in one of the walls of the second pair of walls and rotatably supporting said pinion shaft at one end, said pinion shaft having a bore formed at the other end thereof with the driving end of the motor shaft disposed in said bore, an intermediate bearing mounted concentrically about said bore and said driving end of the motor shaft, said intermediate bearing rotatably supporting said other end of the pinion shaft and said driving end of the motor shaft, a first tolerance ring interposed between the driving end of the shaft and said bore to hold said motor in torsional engagement with said pinion shaft, and a second tolerance ring engaging said intermediate bearing for holding said bearing in nonrotational relation with the gear motor.

8. A gearing unit comprising a unitary gear case having a first and a second pair of oppositely disposed walls, an output shaft rotatably supported by the first pair of walls and extending through at least one of the walls of said first pair of walls, an output gear mounted on said output shaft, a pinion shaft extending transversely of said output shaft and having a pinion meshed with said output gear, a pinion shaft bearing means mounted in one of the walls of said second pair of walls and rotatably supporting the pinion shaft at one end, a bearing having an inner and an outer race, a rabbet formed in the other one of said second pair of walls and engaging a portion of said outer race to align said bearing with respect to said pinion shaft bearing means in the opposed wall, said inner race of said bearing mounted on said pinion shaft for rotation therewith, a bearing support member attached to said gear case and having a bearing receiving recess formed therein, said recess presenting an annular surface in predetermined spaced relationship with a portion of the outer race of said bearing, and a resilient interference ring disposed between said annular surface and said outer race to hold the outer race of the bearing in nonrotational relation with said member.

References Cited by the Examiner

UNITED STATES PATENTS

| | | |
|---|---|---|
| 1,156,582 | 10/1915 | Biggar. |
| 2,641,139 | 6/1953 | Beisner _____ 74—421 |
| 2,918,825 | 12/1959 | Bade _____ 74—606 X |
| 2,931,412 | 4/1960 | Wing. |
| 2,956,187 | 10/1960 | Wood _____ 310—75 |
| 2,992,868 | 7/1961 | Vacha _____ 308—236 |
| 3,145,547 | 8/1964 | Lyons _____ 308—236 X |

FOREIGN PATENTS

| | | |
|---|---|---|
| 1,047,719 | 7/1953 | France. |
| 1,337,146 | 7/1963 | France. |
| 146,527 | 8/1954 | Sweden. |

DAVID J. WILLIAMOWSKY, *Primary Examiner.*

J. A. WONG, *Assistant Examiner.*